Figure 1:
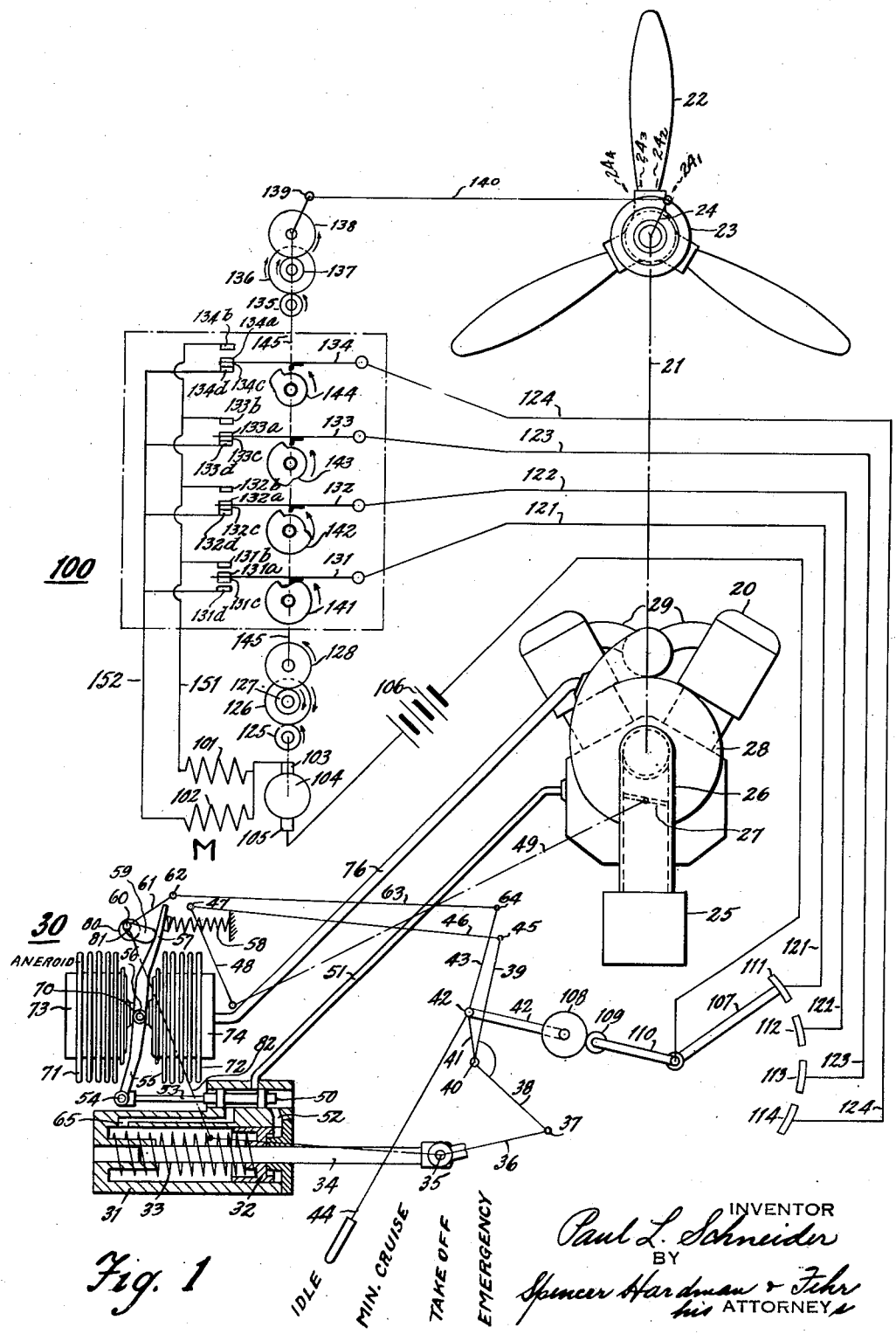

Sept. 20, 1949.　　　　P. L. SCHNEIDER　　　　2,482,559
ENGINE CONTROL DEVICE

Filed Nov. 16, 1942　　　　　　　　　　　　　　3 Sheets-Sheet 1

INVENTOR
Paul L. Schneider
BY
Spencer Hardman & Fehr
his ATTORNEYs

Sept. 20, 1949.　　　P. L. SCHNEIDER　　　2,482,559
ENGINE CONTROL DEVICE

Filed Nov. 16, 1942　　　　　　　　　　　　　3 Sheets-Sheet 2

INVENTOR
Paul L. Schneider
BY
Spencer Hardman & Fehr
his ATTORNEYS

Sept. 20, 1949.　　　　P. L. SCHNEIDER　　　　2,482,559
ENGINE CONTROL DEVICE

Filed Nov. 16, 1942　　　　　　　　　　　　3 Sheets-Sheet 3

INVENTOR
Paul L. Schneider
BY
Spencer Hardman & Fehr
his ATTORNEYS

Patented Sept. 20, 1949

2,482,559

UNITED STATES PATENT OFFICE 2,482,559

ENGINE CONTROL DEVICE

Paul L. Schneider, Anderson, Ind., assignor to General Motors Corporation, Detroit, Mich., a corporation of Delaware Application November 16, 1942, Serial No. 465,671

8 Claims. (Cl. 170—135.74)

1

This invention relates to a control for a supercharged airplane engine whereby a selected manifold pressure is automatically obtained and the propeller pitch controlling mechanism is automatically adjusted so as to coordinate propeller or engine speed with the selected pressure.

In the copending application of John Dolza and others Serial No. 449,918, filed July 6, 1942, there is disclosed a controller unit connected with the engine throttle and manually adjusted so as to obtain a selected manifold pressure which is maintained in the desired relation to altitude variations. This controller provides also for adjusting the propeller pitch controlling mechanism in coordinated relation to selected engine pressures. For this purpose the controller has an operating arm mechanically connected with the propeller pitch controlling mechanism. In installations where the propeller and engine are a short distance apart the mechanical connection between the controller of the engine throttle valve and the propeller pitch controlling mechanism can be easily made. Where there is relatively great distance between the propeller and engine, satisfactory mechanical connections between the controller and the engine, which may be behind the pilot, and the propeller pitch controlling mechanism, which may be near the nose of the airplane, can be made only with great difficulty.

It is, therefore, an object of the present invention to provide a unit separated from the engine fuel intake pressure regulating unit, which is capable of being mounted adjacent to or combined with the propeller pitch adjusting mechanism, said unit being under the control of the pressure regulating unit and capable of changing the setting of the governed speed adjustment lever of the propeller pitch adjusting mechanism so that the engine speed will be governed in predetermined relation to a selected pressure to be maintained by the pressure regulating means. According to the disclosed embodiments of the present invention this object is accomplished by providing an electric servo-motor for shifting the position of the governed speed adjusting lever and a servo-motor control apparatus under the control of the pressure regulating means.

Further objects and advantages of the present invention will be apparent from the following

2 description, reference being had to the accompanying drawings wherein a preferred embodiment of the present invention is clearly shown.

In the drawings the four figures of the drawings are diagrams of the different embodiments of the present invention.

Referring to Fig. 1, an engine 20 drives, through a shaft 21, a propeller 22 having a propeller pitch governing mechanism contained in a unit 23 rotatable with the propeller, said unit having an adjusting lever 24. Fuel mixture for the engine is supplied by the carburetor 25 connected with an induction pipe 26 having a valve 27 and leading to a supercharger 28 connected with the engine intake manifold 29. The throttle valve controller unit 30 comprises an engine-oil-pressure-operated servo-motor which includes a cylinder 31 and a piston 32 normally maintained at the right by a spring 33. Piston 32 is attached to a rod 34 connected at 35 with a link 36 connected at 37 with a bell crank having arms 38 and 39 and pivotally supported at 40 on the free end of an arm 41 extending from a shaft 42 to which arms 43 and 44 are connected. Arm 39 is connected at 45 with link 46 connected at 47 with arm 48 fixed to a shaft 49 which operates the valve 27.

Lever 44 is manually controlled by the pilot. Fig. 1 shows the engine idle position of lever 44. When taking off, the pilot moves lever 44 counterclockwise to a predetermined position thereby causing pivot 40 to move counterclockwise, since the servo piston 32 does not immediately move toward the left, pivot 35 remains fixed. Therefore the bell crank differential lever arms 38, 39 are caused to rotate clockwise relative to pivot 40, thereby causing link 46 to move toward the right, the arm 48 to move clockwise and likewise the throttle 27 thereby causing the throttle to be moved to an open position which is nearly sufficient for the requirements of take-off. This movement of arm 44 is accompanied by movement toward the right of a valve 50 which controls the passage of engine pressure oil from a pipe 41 through a passage 52 to the right side of piston 32. In order to receive this movement, the valve 50 is connected by a rod 53 with a pivot 54 on the lower end of a lever 55 pivotally supported at 56 and having its upper end 57 engaged by a spring 58 which urges the lever 57 against a cam 59 fastened to a shaft 60 connected by an arm 61 which is connected at 62 with a link 63 connected at 64 with the arm 43. Therefore when the main control lever 44 is moved counterclockwise or toward the right in Fig. 1, cam 59 is rotated counterclockwise to permit the spring 58 to move the lever 55 counterclockwise and the valve 50 toward the right to cut off communication between engine oil pressure pipe 51 and a passage 65 leading to the left end of cylinder 31 and to cause pipe 51 to communicate with passage 52 leading to the right end of cylinder 31. Then the servo-piston 32 moves toward the left to cause further opening movement of the throttle 27 to such extent that a selected engine intake pressure is obtained. In order that this intake pressure will be maintained independently of altitude, the movements of the pivotal support 56 of lever 55 are controlled in accordance with engine intake pressure. Pivot 56 is provided by a bridge 70 connecting the adjacent movable ends of Sylphons 71 and 72 having fixed ends 73 and 74 respectively. The Sylphon 72 is connected by pipes 75 and 76 with the outlet of supercharger 28. The Sylphon 73 is evacuated so that the bellows system is independent of variations in pressure of the surrounding atmosphere. Calibrated springs not shown are located within the bellows in order that the movements thereof will be properly coordinated with variations in intake manifold pressure. When the unit 30 functions to move the valve 27 to obtain a selected intake pressure then further opening movement of the valve will be arrested. When the selected pressure is obtained in the bellows 72, then the valve 50 will have been moved into such position as to cover both of the ports 65 and 52 so that piston 32 will remain in such position as required to maintain the throttle valve 27 in the position which gives the selected pressure. As the plane increases in altitude the throttle 27 will be automatically opened wider and wider in order that the selected pressure will be maintained in the desired relation to altitude. The shaft 60 of the pressure selecting cam 59 is mounted eccentrically in a shaft 80, the center of which is indicated by the dot 81. Shaft 80 is connected by arm 82 and link 83 with the pivot 35 on rod 34. As rod 34 moves toward the left from the position shown, the shaft 80 moves clockwise thereby causing the center of shaft 60 to move clockwise about the axis 81 of shaft 80. This movement produces a modification of the originally selected position of the cam 59 in such manner that the controller comes into a state of equilibrium when the intake manifold pressure is slightly less than that actually selected by movement of the lever 44. At sea level, this modification is very small, but increases as altitude increases. At critical altitude the modification of the pressure selection is a few percent reduction in the pressure originally selected at sea level. The advantages of this adjustment are two: namely, (1) account is taken of the fact that as altitude increases, the exhaust back pressure decreases, therefore it is not necessary to maintain at critical altitude the intake pressure selected for take-off at sea level in order that the indicated mean effective pressure of the engine will remain the same; (2) the controller unit is more stable in operation because the movement of the piston 32 toward the left in response to the opening of port 52 by valve 50 causes part of the movement of the valve 50 which closes the port 52. Therefore, a hunting action of the control unit 30 is prevented.

The control unit 30 is described in detail and is claimed in the copending Dolza et al. application which also discloses mechanical means directly controlled by lever 44 for moving an operating arm which is mechanically connected with the propeller pitch governor. In place of a propeller pitch governor controller coordinated mechanically with the unit 30, I provide a separate controller unit 100 comprising an electric servo-motor M for shifting the position of the governed speed adjusting lever 24 and motor controlling apparatus under the control of the pressure regulating unit 30 for controlling the servo-motor M to effect a setting of the governed speed adjusting lever 24 in predetermined relation to a pressure selected to be maintained by the pressure regulating unit. The motor M comprises fields of opposite polarity 101 and 102 connected through motor brush 103, armature 104, motor brush 105, with battery 106 which is connected with a contact arm 107 driven by shaft 42 of the controller unit 30 through gears 108 and 109 and a shaft 110 upon which the arm 107 is mounted. Arm 107 is engageable with any one of a plurality of stationary contacts 111, 112, 113 and 114 connected respectively with wires 121, 122, and 123 and 124 which are connected with resilient conducting blades 131, 132, 133 and 134, which are engaged respectively by cams 141, 142, 143 and 144 mounted on a shaft 145 driven by the motor M through speed reducing gears 125, 126, 127 and 128. Shaft 145 drives speed-reducing gears 135, 136, 137 and 138, the latter of which drives an arm 139 connected by a link 140 with the governed speed adjusting lever 24.

Blade 131 carries contacts 131a and 131c engageable respectively with contacts 131b and 131d. Blade 132 carries contacts 132a and 132c respectively engageable with contact 132b and 132d. Blade 133 carries contacts 133a and 133c respectively engageable with contacts 133b and 133d. Blade 134 carries a contact 134c normally engaging contact 134c and a contact 134a for making engagement with a contact 134b. The upper side contacts 131b, 132b, 133b and 134b are connected by wire 151 with the field winding 101; and the lower side contacts 131d, 132d, 133d and 134d are connected by wire 152 with motor field winding 102. Contact arm 107 has four positions corresponding to four control positions of lever 44, namely: idle, minimum cruise, take-off and emergency. These four positions effect the selection of different fuel intake pressures to be maintained. Coordinated with these four intake pressures are four governed speeds to be maintained, namely, those corresponding to four positions $24_1$, $24_2$, $24_3$ and $24_4$ of the governed speed adjusting lever 24. When lever 44 is at idle position as shown, contact arm 107 is on contact 111 and lever 24 is at $24_1$. Movement of lever 44 counterclockwise to minimum cruise position moves arm 107 to contact 112 which so affects the motor control system that the motor M will move the lever 24 from $24_1$ to $24_2$. Movement of lever 44 from minimum cruise position to take-off position moves arm 107 to contact 113 which so affects the motor control system that motor M will move lever 24 from $24_2$ to $24_3$. Movement of lever 44 from minimum cruise position to emergency position moves arm 107 to contact 114 which so affects the motor control system that motor M will move lever 24 from $24_3$ to $24_4$. Movement of lever 44 clockwise with its various positions causes corresponding clockwise movements of arm 24 to take place.

In order that the motor control system will be affected in the manner described, the cams 141, 142, 143 and 144 are shaped, as shown in Fig. 1, to produce the results given in the following schedule:

|  | Motor has stopped— | | | |
| --- | --- | --- | --- | --- |
|  | with arm 107 at contact 111 | with arm 107 at contact 112 | with arm 107 at contact 113 | with arm 107 at contact 114 |
| Cam 141 | upper and lower contacts open. | upper contacts closed | upper contacts closed | upper contacts closed. |
| Cam 142 | lower contacts closed | upper and lower contacts open | do | Do. |
| Cam 143 | do | lower contacts closed | upper and lower contacts open. | Do. |
| Cam 144 | do | do | lower contacts closed | lower contacts open. |
| Lever 24 | at 24₁ | at 24₂ | at 24₂ | at 24₂. |
| Lever 44 | idle | minimum cruise | take-off | emergency. |

When lever 44 is at idle, arm 107 is on contact 111, and the motor M is at rest since contacts 131a and 131b are separated. If pressure selecting lever 44 is moved right to minimum cruise position arm 107 is caused to engage contact 112 and motor M is energized through the circuit including contacts 132c and 132d. Motor M rotates the gears and cams in the direction of the arrows until cam 142 has engaged blade 132 and caused contact 132c to be separated from contact 132d. When lever 44 moves to take-off position and arm 107 has been moved into engagement with contact 113, motor M will operate until cam 143 has engaged blade 133 and has caused separation of contacts 133c and 133d. When lever 44 moves to emergency position and arm 107 engages the stationary contact 114, motor M will operate until the cam 144 elevates to blade 144 to separate contact 134c from contact 134d.

In order that the lever 24 may be rotated clockwise from position 24₄, it is necessary that the cams 141, 142 and 143 be so constructed that by the time that cam 144 has lifted contact 134c away from contact 134d the other cams will have lifted the various blades 131, 132 and 133 to such extent that the upper side contacts will be electrically connected with the blades. Therefore, when movable contact 107 is moved away from contact 114 into engagement with contact 113, a circuit will be established which includes motor field winding 101. Therefore, motor M will rotate the cams and gears in directions opposite to that indicated by the arrows in order to move the lever 24 from position 24₄ in position 24₃ at which position contact 133a would be separated from contact 133b. Likewise when movable contact 107 is moved away from contact 113 into engagement with contact 112 a circuit would be established by contacts 132a and 132b with motor field winding 101. Therefore, motor M would rotate the cams and gears in directions opposite to that indicated by the arrows in order to move lever 24 from position 24₃ to position 24₂ at which position contact 132a would be separated from contact 132b. Likewise when movable contact 107 is moved away from contact 112 into engagement with contact 111 a circuit would then be established by contact 131a and 131b with motor field winding 101 thereby causing motor M to rotate the cams and gears in directions opposite to that indicated by the arrows, thereby causing lever 24 to move from the position 24₂ to position 24₁ in which position of the lever 24, the contact 131a would be separated from contact 131b.

By changing the connections between contacts 111, 112, 113 and 114 and levers 131, 132, 133 and 134 other combinations between positions of lever 44 and positions of lever 24 can be effected.

Figure 2:
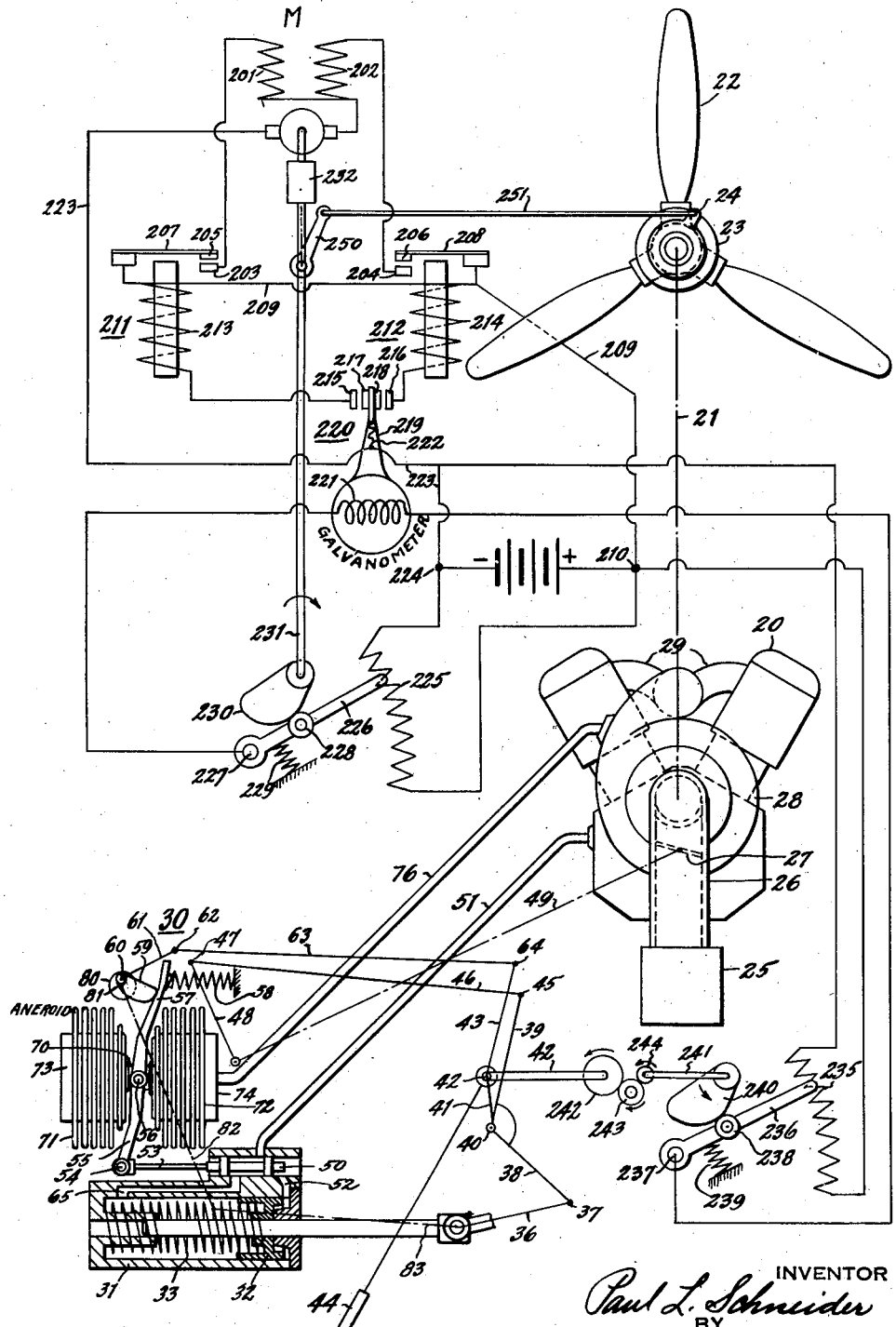

In the form of the invention shown in Fig. 2, the servo-motor M has its field winding 201 and 201 opposite polarity connected respectively with contacts 203 and 204 of relays 211 and 212 adapted to be engaged by contacts 205 and 206, respectively, carried by flexible blade armatures 207 and 208 respectively, connected by wire 209 to positive terminal 210 of battery B. The magnet coils 213 and 214 of said relays are connected with wire 209 and the contacts 215 and 216 of a galvanometer operated switch 220. Contacts 215 and 216 are engaged respectively by contacts 217 and 218 carried by arm 219 of the switch 220. Arm 219 is rotated in one direction or the other depending upon the direction of current flow through galvanometer coil 221. Contacts 217 and 218 are connected with wire 222 connected with wire 223 connecting motor M with regulator terminal 224 of battery B.

A bare wire potentiometer coil 225 is connected with the battery terminals 210 and 224. Coil 225 is engaged by a metal wiper blade 226 pivoted at 227 and carrying a roller 228 urged by a spring 229 against a cam 230 carried by a shift 231 driven by motor M through speed-reducing gears 232. A bare wire potentiometer coil 235 is connected with the battery terminal 210 and 224. Coil 235 is engaged by a metal wiper blade 236 pivoted at 237 and carrying a roller 238 urged by a spring 239 against a cam 240 carried by a shaft 241 driven by shaft 42 of pressure regulator unit 42 through gears 242, 243 and 244. Galvanometer coil 221 is connected with wiper blades 226 and 236. Shaft 231 drives an arm 250 connected by link 251 with the governed speed adjusting lever 24.

The operation of the form shown in Fig. 2 is as follows: When lever 44 is moved to effect a selection of pressure to be maintained by unit 30, wiper blade 236 is moved into a predetermined position with respect to coil 235. That position depends upon what pressure has been selected by movement of lever 44. If the relation of the wiper blade 226 to the coil 225 is not then the same as the predetermined relation between blade 236 and coil 235, current will flow through the galvanometer coil 221 in one direction or the other depending upon the sense in which these relationships differ. If blade 226 is too far down, arm 219 will turn clockwise to close contacts 216, 218 thereby energizing coil 214 of relay 212 to cause contacts 204, 206 to close to cause motor M to operate with field coil 202 energized. Motor M will rotate cam 230 clockwise to allow spring 229 to force blade 226 upwardly to bring the potentiometer coils 225 and 235 into balance. When this occurs, no current flows through galvanometer coil 221 and the arm 219 returns to mid position and motor M stops after having moved the governed speed adjusting lever 24 clockwise into a predetermined relation to the pressure selecting lever 44. This predetermined relation can be established if arm 24 has been moved too far to the right of its correct position. In that case the wiper blade 226 would have been too far up at the time blade 236 had been placed in this predetermined relation to arm 44 when latter had been moved to a certain pressure selecting position. When wiper arm 226 is too far up, galvanometer arm 219 moves counterclockwise to engage contacts 215, 217 thereby energizing relay magnet coil 213 thereby closing contacts 203, 205 and causing motor M to rotate in the opposite direction with its field coil 201 excited. As cam 230 is moving counterclockwise to establish the same relation between wiper 226 and coil 225 as exists between wiper 236 and coil 235, lever 24 is moving counterclockwise. When the relation between wiper 226 and coil 225 becomes the same as exists between wiper 236 and coil 235, no current flows through galvanometer coil 221; and arm 219 returns to mid-position and the motor M stops, leaving arm 24 in the correct predetermined relation to arm 44. Therefore arm 24 is caused to follow arm 44 according to whatever rule is in order for a particular engine. This rule determines the contour of the two cams 230 and 240 which are the same in contour. The illustrated cams 230 and 240 provide for such control of motor M that lever 24 moves counterclockwise from a low governed speed position to a high governed speed position when lever 44 moves counterclockwise from a lower pressure selection to a higher pressure selection. If, for an intermediate pressure selection, the engine requires an adjustment of governed speed to a value which is lower the speeds desirable for engine idling pressure and engine maximum pressure, the cams 230 and 240 would be shaped so as to meet this requirement.

Figures 3, 4:
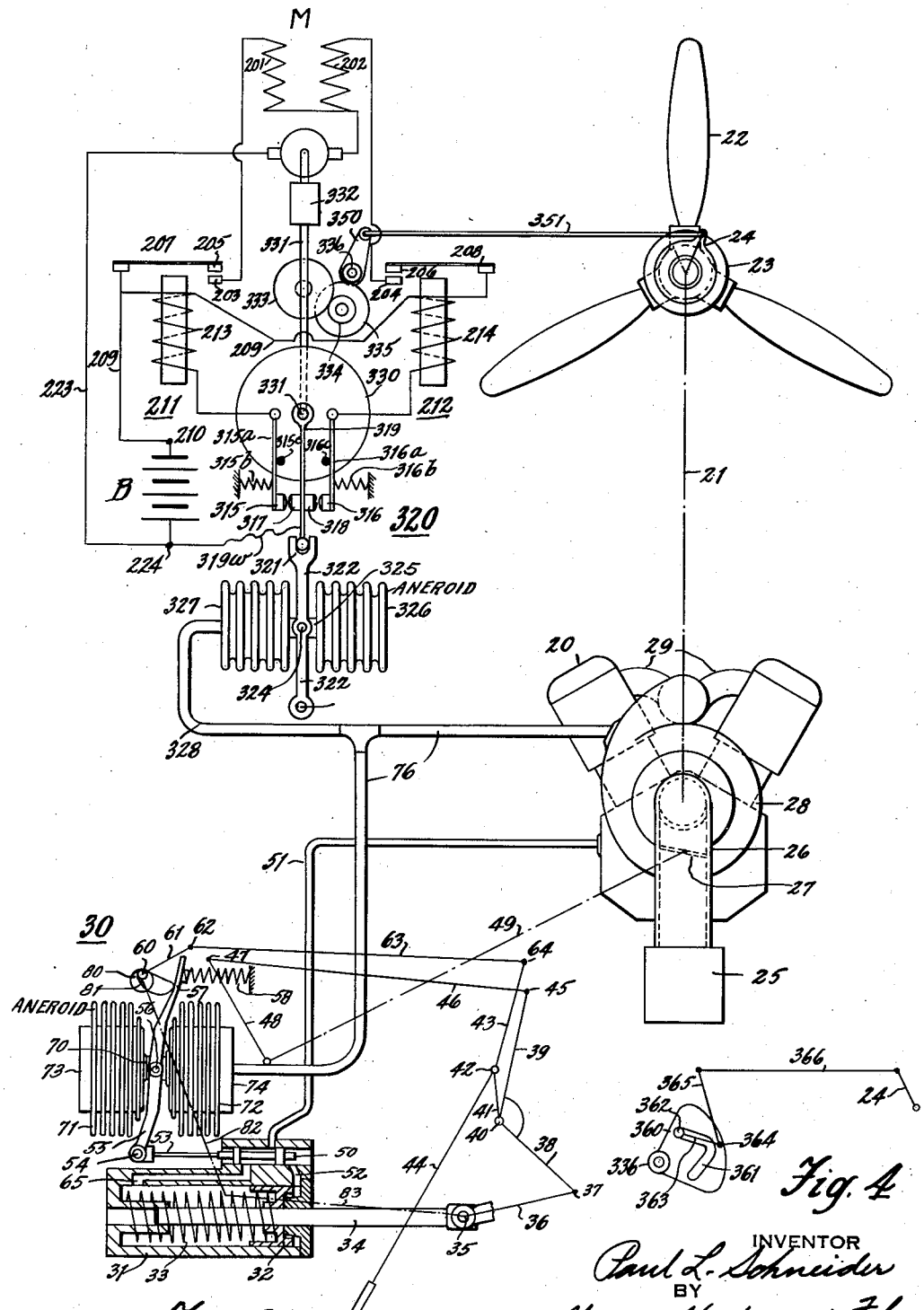

In the form shown in Fig. 3, the servo-motor M is under the direct control of fuel intake pressure communicating through pipes 76 and 328 with bellows 327 connected by bridge 325 with aneroid 326 in order that the control will not be affected by changes in atmospheric pressure. Bridge 325 carries a pivot 324 for a lever 322 having a fixed pivot 323 and having a fork 321 engage the free end of a lever 319 of a pressure controlled switch unit 320. The switch unit 320 includes contacts 317 and 318 carried by lever 319 and engageable respectively with contacts 315 and 316 mounted respectively on arms 315a and 316a and urged respectively toward stops 315c and 316c, by springs 315b and 316b respectively. Wire 319w connects lever 319 with battery terminal 224. Contacts 315, 317 control relay magnet coil 213; and contacts 316, 318 control relay magnet coil 214. Pins 315c, 316c are mounted on a disc 330 driven by a shaft 331 driven by motor M through speed reduction gearing 332. Shaft 331 drives gear 333 which drives gear 334 which drives gear 335 which drives gear 336 which drives arm 350 connected by a link 351 with governor speed adjusting lever 24.

Normally the contacts 317, 318 together stand midway between side contacts 315, 316 held away from contacts 317, 318 by pins 315c and 316c respectively. When intake pressure increases, pin 324 moves right and arm moves counterclockwise. Contact 318 engages contact 316 and motor M operates with field 202 excited to cause disc 330 and gear 333 to rotate counterclockwise, hence arm 350 and lever 24 to rotate counterclockwise. This rotation continues until pin 316c has moved sufficiently to separate contact 316 from contact 318. The extent of movement of lever 24 is determined by the extent of movement of pins 316c before contacts 316, 318 separate. The extent of this movement is determined by the amount of increase in pressure. Likewise, when the intake pressure decreases, lever 322 and contact 317 move left to engage contact 315 and motor M will move left with field coil 201 excited to cause clockwise rotation of disc 330 and gear 333, and hence clockwise rotation of arm 350 and governed speed adjusting lever 24. Motor M will stop when pin 315c has moved left sufficiently to separate contacts 315, 317. The extent of clockwise movement of disc 330, arm 350 and lever 24 is determined by extent of movement of pivot pin 324 to the left as bellows 327 contracts due to decrease in intake pressure. When constructed according to Fig. 3, the device provides for increasing governed engine speed as the value of the selected intake pressure increases.

If it is required that governed speed and selected pressure be coordinated according to some other rule, Fig. 3 is modified as shown by Fig. 4. Gear 336 drives a cam plate 360 having a slot 361 receiving a roller 362 carried by a bellcrank lever arm 363 pivoted at 364 and operating an arm 365 connected by link 366 with arm 24. The cam slot 361 is designed to follow the rule of coordination of the movements of levers 44 and 24.

While the embodiments of the present invention as herein disclosed, constitute preferred forms, it is to be understood that other forms might be adopted, all coming within the scope of the claims which follow.

What is claimed is as follows:

1. Apparatus for coordinating changes in the governed speed of an aircraft engine with changes in the regulated fuel intake pressure comprising the combination with an engine having a throttle valve and a variable pitch propeller driven by the engine and having a governed speed adjusting lever, of an electric servo-motor for shifting the position of the lever, pressure regulating means for shifting the position of the throttle valve for maintaining a selected pressure in the engine intake and including manually controlled means for varying the selection of the pressure to be maintained, and means under the control of the pressure regulating means for controlling the servo-motor to effect a setting of the governed speed adjusting lever in predetermined relation to the selected pressure.

2. Apparatus for coordinating changes in the governed speed of an aircraft engine with changes in the regulated fuel intake pressure comprising the combination with an engine having a throttle valve and a variable pitch propeller driven by the engine and having a governed speed adjusting lever, of an electric servo-motor for shifting the position of the lever, pressure regulating means for shifting the position of the throttle valve for maintaining a selected pressure in the engine intake and including manually controlled means for varying the selection of the pressure to be maintained, a current source, circuits including limit switches respectively for determining the extent of movement of the governed speed adjusting lever by the electric motor, cams operated by the motor and cooperating respectively with the limit switches, said cams being shaped respectively to cause the functioning of the limit switches to stop the motor after varying amounts of movement of the motor have taken place, and means controlled by the manually operated pressure selecting means of the pressure regulator for selectively connecting the limit switches in circuit with the motor and current source, whereby the servo-motor operates to effect a setting of the governed speed adjusting lever in predetermined relation to selected pressure.

3. Apparatus for coordinating changes in the governed speed of an aircraft engine with changes in the regulated fuel intake pressure comprising the combination with an engine having a throttle valve and a variable pitch propeller driven by the engine and having a governed speed adjusting lever, of an electric servo-motor for shifting the position of the lever, pressure regulating means for shifting the position of the throttle valve for maintaining a selected pressure in the engine intake and including manually controlled means for varying the selection of the pressure to be maintained, said electric motor having two fields reversely wound to obtain rotation of the motor in either direction, a current source having one terminal connected with the motor, a plurality of limit switches each having side contacts and a movable member capable of making electrical connection with either of the side contacts, a circuit connecting one of the motor fields with one side contact of each limit switch, a circuit connecting the other motor field with the other side contact of each limit switch, cams operated by the motor and operated respectively to move the movable members of the limit switches, said cams being shaped respectively to cause the functioning of the limit switches to stop the motor after varying amounts of movement of the motor have taken place, and means controlled by the manually operated pressure selecting means of the pressure regulator for selectively connecting the movable members of the limit switches in circuit with the motor and current source, whereby the servo-motor operates to effect a setting of the governed speed adjusting lever in predetermined relation to selected pressure.

4. Apparatus for coordinating changes in the governed speed of an aircraft engine with changes in the regulated fuel intake pressure comprising the combination with an engine having a throttle valve and a variable pitch propeller driven by the engine and having a governed speed adjusting lever, of an electric servo-motor for shifting the position of the lever, pressure regulating means for shifting the position of the throttle valve for maintaining a selected pressure in the engine intake and including manually controlled means for varying the selection of the pressure to be maintained, a current source, motor control circuits respectively for connecting the electric motor with the source for operation of the motor in opposite directions, a galvanometer having a movable member and an operating coil, switching means under the control of the galvanometer member for selectively completing said motor control circuits depending on the direction of movement of the galvanometer member from neutral position, similar potentiometer resistances connected in parallel with the current source, movable resistance contactors connected with the galvanometer operating coil, means operated by the manually operated pressure selecting means of the pressure regulator for moving one of the resistance contactors in order to upset the balance of the potentiometers and to obtain a movement of the galvanometer member to effect an operation of the electric motor, and means operated by the electric motor for moving the other resistance contactor in order to reestablish the balance of the potentiometers and the cessation of movement of the electric motor whereby the electric motor operates to effect a setting of the governed speed adjusting lever in predetermined relation to selected pressure.

5. Apparatus for coordinating changes in the governed speed of an aircraft engine with changes in the regulated fuel intake pressure comprising the combination with an engine having a throttle valve and a variable pitch propeller driven by the engine and having a governed speed adjusting lever, of an electric servo-motor for shifting the position of the lever, pressure regulating means for shifting the position of the throttle valve for maintaining a selected pressure in the engine intake and including manually controlled means for varying the selection of the pressure to be maintained, a current source, motor control circuits respectively for connecting the electric motor with the source for operation of the motor in opposite directions, switching means responsive to engine intake pressure under the control of the pressure regulator for selectively completing said motor control circuits for causing the motor to move the governed speed adjusting lever, and means operated by the electric motor for disconnecting the selected motor control circuit when the motor has operated sufficiently to move the governed speed adjusting lever into a position having a predetermined relation to the pressure to be maintained by the pressure regulator.

6. Apparatus for coordinating changes in the governed speed of an aircraft engine with changes in the pressure maintained in the engine intake comprising the combination with an engine having a variable pitch propeller driven thereby and provided with a governed speed adjusting lever for controlling the propeller pitch and having an adjustable throttle valve for controlling the intake pressure, pressure regulating means for variably positioning the throttle valve to maintain some selected pressure in the engine intake, a manually operable member movable to different positions to select different pressures to be maintained, a current source, an electric servo motor in circuit with said current source and operable to move the speed adjusting lever to change the propeller pitch, a series of switches between the current source and the one motor for variably controlling the operation of said motor and effective to stop the motor when opened, a plurality of members operable by the motor to open said switches after different degrees of operation of said motor, and means operable by the selector member for connecting the different switches of said series with the current source as the selector member is moved to different positions to select different pressures to be maintained in the engine intake whereby the propeller pitch adjusting lever is moved to different positions.

7. Apparatus for coordinating changes in the governed speed of an aircraft engine with changes in the pressure maintained in the engine intake comprising the combination with an engine having a variable pitch propeller driven thereby and provided with a governed speed adjusting lever for controlling the propeller pitch and having an adjustable throttle valve for controlling the intake pressure, pressure regulating means for variably positioning the throttle valve to maintain some selected pressure in the engine intake, a manually operable member movable to different positions to select different pressures to be maintained, a current source, an electric servo motor in circuit with said current source and operable to move the speed adjusting lever to change the propeller pitch, a series of switches between the current source and the one motor for variably controlling the operation of said motor and effective to stop the motor when opened, a plurality of members operable by the motor to open said switches after different degrees of operation of said motor, a second series of switches each of which is in circuit with one of the first series of switches and each of which when closed connects one of said first series of switches with the current source, and means operable by the selector member for closing one or the other of said second series of switches as the selector member is moved to different positions, whereby the propeller pitch adjusting lever is moved to different positions as said selector member is moved to select different pressures to be maintained in the engine intake.

8. Apparatus for coordinating changes in the governed speed of an aircraft engine with changes in the pressure maintained in the engine intake comprising the combination with an engine having a variable pitch propeller driven thereby and provided with a governed speed adjusting lever for controlling the propeller pitch and having an adjustable throttle valve for controlling the intake pressure, pressure regulating means for variably positioning the throttle valve to maintain some selected pressure in the engine intake, a manually operable member movable to different positions to select different pressures to be maintained, a current source, an electric servo motor in circuit with said current source and operable to move the speed adjusting lever to change the propeller pitch, a series of switches between the current source and the one motor for variably controlling the operation of said motor and effective to stop the motor when opened, a series of differential cams each of which is associated with one of said switches and operable by the motor to effect opening of said switches after different degrees of rotation of said motor, a second series of switches each of which is in circuit with one of the first series of switches and each of which when closed connects one of said first series of switches with the current source, and means operable by the selector member for closing one or the other of said second series of switches as the selector member is moved to different positions, whereby the propeller pitch adjusting lever is moved to different positions as said selector member is moved to select different pressures to be maintained in the engine intake.

PAUL L. SCHNEIDER.

REFERENCES CITED

The following references are of record in the file of this patent:

UNITED STATES PATENTS

| Number | Name | Date |
| --- | --- | --- |
| 595,344 | Russell | Dec. 14, 1897 |
| 1,388,632 | Dean | Aug. 23, 1921 |
| 1,944,321 | Hudson | Jan. 23, 1934 |
| 1,954,142 | Moffett | Apr. 10, 1934 |
| 1,956,419 | Garrett | Apr. 24, 1934 |
| 2,055,363 | Powell | Sept. 22, 1936 |

FOREIGN PATENTS

| Number | Country | Date |
| --- | --- | --- |
| 467,103 | Great Britain | June 10, 1937 |